United States Patent [19]

Davis

[11] 4,131,592
[45] Dec. 26, 1978

[54] FLAME RETARDANT RUBBER FLOORING COMPOSITION

[75] Inventor: Fred R. Davis, Kent, Ohio

[73] Assignee: The R.C.A. Rubber Company, Akron, Ohio

[21] Appl. No.: 888,286

[22] Filed: Mar. 20, 1978

Related U.S. Application Data

[63] Continuation of Ser. No. 737,040, Oct. 29, 1976, abandoned.

[51] Int. Cl.$^2$ .............................................. C08L 91/00
[52] U.S. Cl. ...................... 260/23.7 R; 260/33.6 AQ; 260/42.37; 260/45.7 R; 260/46.75 B
[58] Field of Search .................. 260/23.7 R, 33.6 AQ, 260/42.37, 45.7 R, 45.75 B

[56] References Cited

U.S. PATENT DOCUMENTS

| | | | |
|---|---|---|---|
| 2,427,942 | 9/1947 | Bulifant | 260/42.37 |
| 3,333,970 | 8/1967 | Green | 260/45.75 B |
| 3,639,298 | 2/1972 | Lister et al. | 260/28.5 B |

OTHER PUBLICATIONS

Whitby; SYNTHETIC RUBBER (Wiley, NY) 1954; pp. 546,548,551.
Morton; INTRODUCTION TO RUBBER TECHNOLOGY (Reinhold); 1959; p. 170.
Frankenhoff et al.; PLASTICS TECHNOLOGY; Aug. 1969; pp. 43–46.
ENCYCLOPEDIA OF POLYMER SCIENCE AND TECHNOLOGY; vol. 7; Interscience; 1967; pp. 17–19.

*Primary Examiner*—Lewis T. Jacobs
*Attorney, Agent, or Firm*—Oldham, Oldham, Hudak & Weber Co.

[57] ABSTRACT

A flame retardant synthetic rubber composition for use as a flooring material including a high bound styrene resin polymer and known flooring compounding ingredients. A hot emulsion SBR polymer, antimony oxide, a chlorinated paraffin hydrocarbon and hydrated alumina are present and the composition also includes a high flash point naphthenic oil.

6 Claims, No Drawings

FLAME RETARDANT RUBBER FLOORING COMPOSITION

This is a continuation of my application Ser. No. 737,040, filed Oct. 29, 1976, now abandoned.

BACKGROUND OF THE INVENTION

Heretofore there have been many different compositions proposed and used commercially for various flame retarding products and articles made from elastomeric compositions involving synthetic rubbers, natural rubbers, plastic materials and the like. These flame retardant compositions usually will char but will not support independent or continued combustion.

There are many uses for flame retardant elastomeric articles and compositions, and one use thereof may be as elastic flooring materials. Flooring that is used in confined areas where combustion is particularly objectionable, such as in submarines, in boats, and in some mining uses, etc., preferably should be non-combustible.

It also should be realized that synthetic rubber compositions, such as for use in flooring products, still must be relatively easy or conventional in their properties insofar as the handling and processing of the materials in production practices are concerned. Hence, the rubber and compounding materials used should be capable of being processed readily in rubber mixing mills, on calenders, or extruders, and the rubber compositions should have no excessive shrinkage and present little more than normal difficulties in the plant processing and vulcanization thereof.

The general object of the present invention is to provide a novel and improved rubber composition flooring material that has very good flame retardant properties and wherein the rubber composition can be processed under substantially normal factory rubber processing conditions, operations and procedures.

Another object of the invention is to provide a rubber composition flooring material that is made from a hot emulsion polymer synthetic rubber, that has fire retardant materials therein and which has a fire retardant or coolant material such as hydrated alumina therein and wherein preferably the composition includes a high flash point naphthenic oil in the oil and plasticizer system of the material.

Another object of the invention is to provide a flame retardant rubber composition wherein the fire retardant materials therein have a synergistic effect in combination with each other; and where rubber flooring made therefrom has superior properties.

Other objects and advantages of the invention will be made more apparent as the specification proceeds.

The flooring composition of the invention can be provided in other colors, but it will be particularly described as a white flooring material which is flexible and resilient.

Test flooring articles made from compositions of the invention have been tested under standard flame retardant test conditions including surface flammability test A.S.T.M. E-162. The flame spread index of these materials was found to be less than or equal to 25. Furthermore, the material has been made, and then aged to try out its flame retardant properties under actual aging conditions and again the product has tested quite satisfactorily under standard test E-84. The test articles were made from the specific formula listed hereinafter. Obviously, slight variations can be made in the quantities of ingredients given but variations in the amounts of the flame retardant materials are best made in relation to a relatively fixed composition so that an excessive number of variables are not introduced into the formulation.

The flame retardant white flooring composition of the invention that provided excellent properties comprises the following:

| | | | Permissible Range |
|---|---|---|---|
| SBR-1006 | 100 | parts | |
| Hard Clay | 100 | | 100 – 140 |
| Whiting | 40 | | 40 – 0 |
| Titanium Dioxide | 24 | | |
| A High Bound Styrene Resin | 11 | | |
| Zinc Oxide | 2 | | |
| Stearic Acid | 1 | | |
| Antimony Oxide | 6 | | 6 – 10 |
| A Chlorinated Paraffin Hydrocarbon | 32 | | 25 – 40 |
| Sulfur | 9 | | |
| Curing Agent (MBTS) | 2 | | |
| DPG | .75 | | |
| A High Flash Naphthenic Oil | 25 | | 10 – 40 |
| Asbestos | 50 | | |
| Hydrated Alumina | 150 | | 150 – 250 |

In the white flooring composition of the invention, preferably SBR-1006 has been used as the synthetic rubber material whereas other hot emulsion polymers such as SBR-1061 can be used. In SBR-1006, 23.5% of the polymer comprises styrene present in the composition in combined form.

Hard clay used in the composition is provided as a reenforcing material; whereas, whiting when used, comprises a mineral elastomer extender and it normally would comprise calcium carbonate and was that material in the test formulation set forth hereinabove. Titanium dioxide is present as a pigment while zinc oxide, sulfur MBTS and DPG are present as curing ingredients and acceleration systems. The high bound styrene resin used was in the form of "Pliolite" which is a Goodyear Tire & Rubber Company product containing 87% styrene and 13% butadiene, and it is a high bound styrene resin. The fire retardant materials used include antimony oxide and Unichlor Ax70 which is a product of Neville Chemical Company of Pittsburgh, Pennsylvania, and is a 70% chlorinated paraffin hydrocarbon with an average molecular weight of 1200. The hydrated alumina used was RH 730 made by Reynolds Aluminum Company and it is $Al_2O_3.3H_2O$ in the three micron size range. Asbestos is used in pelletized form and is termed Calidria made by Union Carbon Company. The naphthenic oil is provided by Sun Oil Company, and contains 15% aromatics, 38% naphthenic oil, 47% paraffinic materials, and it has a flash point of 440° F. Such specific oil doesn't migrate from the finished article. Similar oils with the same or higher flash points may be used.

These compounding ingredients were conventionally processed and vulcanized to form a white rubber product. For other colors, other pigments can be substituted for the titanium dioxide. Primarily, the invention relates to the provision of the fire retardant material of antimony oxide, chlorinated paraffin hydrocarbon, and hydrated alumina in about the quantities stated in flooring compositions made from hot emulsion polymers and including a high flash point naphthenic oil. This provides very desirable flame retardant products. Otherwise, the flooring composition is substantially conventional and reasonable conventional changes in such other ingredients and the quantities thereof used may be made. Variations in the quantities of the fire retardant materials preferably would be to use them all in their higher ranges or in their lower ranges.

Flooring products made from the compositions of the invention have had superior flame retardant properties and the objects of the invention have been achieved.

While one complete embodiment of the invention has been disclosed herein, it will be appreciated that modification of this particular embodiment of the invention may be resorted to without departing from the scope of the invention.

What is claimed is:

1. A flame retardant synthetic rubber composition for flooring material having a syntehtic rubber hot emulsion polymer combined with a high bound styrene resin, compounding agents, curing agents, and pigments, the improvement to the composition comprising, the flame retardant materials of antimony oxide, a chlorinated paraffin hydrocarbon, hydrated alumina, asbestos and a high flash point naphthenic oil, where about 6 to 10 parts of antimony oxide, about 25 to 40 parts of chlorinated paraffin hydrocarbon, about 150 to 450 parts of hydrated alumina, about 50 parts of asbestos, and about 10 to 40 parts of naphthenic oil are present per 100 parts of said rubber polymer for providing a flame spread index for the composition of less than or equal to 25.

2. A flooring material as in claim 1 where the rubber polymer is SBR hot emulsion polymer.

3. A flame retardant white flooring composition consisting essentially of SBR hot emulsion polymer, hard clay, whiting, titanium dioxide, a high bound styrene resin, zinc oxide, stearic acid, antimony oxide, a chlorinated paraffin hydrocarbon, curing agents, DPG, a high flash naphthenic oil, asbestos and hydrated alumina, and where about 6 to 10 parts of antimony oxide, about 25 to 40 parts of chlorinated paraffin hydrocarbon, about 150 to 450 parts of hydrated alumina, about 50 parts of asbestos, and about 10 to 40 parts of naphthenic oil are present per 100 parts of said SBR polymer for providing a flame spread index for the composition of less than or equal to 25.

4. A composition as in claim 3 and wherein the compounding ingredients are present in about the following quantities:

| | |
|---|---|
| Hard Clay | 100 parts |
| Whiting | 40 |
| Titanium Dioxide | 24 |
| A High Bound Styrene Resin | 11 |
| Zinc Oxide | 2 |
| Antimony Oxide | 6 |
| Stearic Acid | 1 |
| A Chlorinated Paraffin Hydrocarbon | 32 |
| Sulfur | 9 |
| Curing Agents (MBTS) | 2 |
| DPG | .75 |
| A High Flash Naphthenic Oil | 25 |
| Asbestos | 50 |
| Hydrated Alumina | 150 |
| per 100 parts of synthetic rubber | |

5. A flame retardant white flooring composition as in claim 3 where a 70% chlorinated paraffin hydrocarbon having an average molecular weight of 1200 is present in the composition.

6. A flooring material as in claim 3 where the asbestos is present in pelletized form and the hydrated alumina is $Al_2O_3 \cdot 3H_2O$ in the three micron size range.

* * * * *